(12) United States Patent
Lee et al.

(10) Patent No.: US 6,882,919 B2
(45) Date of Patent: Apr. 19, 2005

(54) SHIFT CONTROL METHOD AND APPARATUS OF AN AUTOMATIC TRANSMISSION

(75) Inventors: Jung-Suk Lee, Yongin (KR); Seong-Hyon Park, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 87 days.

(21) Appl. No.: 10/322,185

(22) Filed: Dec. 17, 2002

(65) Prior Publication Data

US 2004/0002803 A1 Jan. 1, 2004

(30) Foreign Application Priority Data

Jun. 28, 2002 (KR) .......................................... 2002-37096

(51) Int. Cl.[7] .............................................. G06F 17/00
(52) U.S. Cl. ........................... 701/59; 701/57; 701/61; 701/65
(58) Field of Search ............................. 701/57, 59, 61, 701/55, 58

(56) References Cited

U.S. PATENT DOCUMENTS

| | | | | | |
|---|---|---|---|---|---|
| 5,390,117 A | * | 2/1995 | Graf et al. | ..................... | 701/57 |
| 5,895,435 A | * | 4/1999 | Ohta et al. | ..................... | 701/59 |
| 5,913,916 A | * | 6/1999 | Bai et al. | ........................ | 701/59 |
| 5,954,777 A | * | 9/1999 | Cao et al. | ..................... | 701/51 |
| 5,957,990 A | * | 9/1999 | Graf et al. | ..................... | 701/57 |
| 6,006,151 A | * | 12/1999 | Graf | ............................. | 701/57 |
| 6,044,317 A | * | 3/2000 | Taffin | .......................... | 701/57 |
| 6,076,032 A | * | 6/2000 | Kuroda et al. | ................ | 701/54 |
| 6,157,886 A | * | 12/2000 | Janecke | ........................ | 701/55 |
| 6,285,941 B1 | * | 9/2001 | Janecke | ........................ | 701/55 |
| 6,311,113 B1 | * | 10/2001 | Danz et al. | ................... | 701/57 |
| 6,311,114 B1 | * | 10/2001 | Graf et al. | ..................... | 701/57 |
| 6,507,780 B1 | * | 1/2003 | Graf | ............................. | 701/51 |
| 2001/0021891 A1 | * | 9/2001 | Kusafuka et al. | ............. | 701/57 |

* cited by examiner

Primary Examiner—Thomas G. Black
Assistant Examiner—Brian J. Broadhead
(74) Attorney, Agent, or Firm—Morgan Lewis & Bockius LLP

(57) ABSTRACT

The shift control method of an automatic transmission calculates a shift-pattern-adjusting coefficient using a modular neural network. The shift-pattern adjusting coefficient is based on a plurality of input signals input from a plurality of detectors. It is then determined if shifting is required based on an adjusted shift-pattern. The adjusted shift-pattern being adjusted based on the shift-pattern adjusting coefficient. A target shift-speed when shifting is required is calculated based on the adjusted shift-pattern. Finally, a shifting signal for shifting to the target shift-speed is generated.

43 Claims, 5 Drawing Sheets

SHIFT CONTROL METHOD AND APPARATUS OF AN AUTOMATIC TRANSMISSION

FIELD OF THE INVENTION

The present invention relates to a shift control method and apparatus of an automatic transmission. More particularly, the present invention is related to a shift control method and apparatus of an automatic transmission in which a neural network is used to determine adjustment of a shift-pattern.

BACKGROUND OF THE INVENTION

An automatic transmission for a vehicle automatically shifts into a shift-speed. The shift-speed is determined based on driving parameters, such as vehicle speed and throttle valve opening (called "throttle opening" hereinafter). Hereinafter, the term "automatic transmission" should be understood to include a continuously variable transmission that automatically forms shift-ratios, from a plurality of predetermined shift-ratios, that are determined to be suitable for driving parameters such as vehicle speed and throttle opening.

In order to determine whether to shift to another shift-speed, a shift-pattern, usually having parameters of vehicle speed and throttle opening, is considered to determine if driving conditions have significantly changed.

Referring to exemplary shift-patterns shown in FIG. 1, determination of whether shifting is required is explained hereinafter.

FIG. 1 shows usual 1->2 upshift and 2->1 downshift shift-patterns. Point "P1" of FIG. 1 denotes a driving state where a vehicle is running at a speed of V1 at a first shift-speed, with a throttle valve opening of TH1 by a driver's operation of an accelerator pedal. When the vehicle speed increases such that it becomes greater than a threshold vehicle speed (V0), for example, when the vehicle speed becomes that at point P2, i.e., at V2, the automatic transmission up-shifts to a second shift-speed.

Similarly, when the driver further operates the accelerator pedal such that the throttle opening becomes greater than a threshold opening (TH0), for example, when the driving state corresponds point P3, i.e., at TH3 the automatic transmission shifts down back to the first shift-speed.

Preferably, such shift-patterns should be set dependent on driving conditions such as driver's driving propensity, and/or shifting modes, such as economy and power modes. Therefore, various shift-patterns may be used. For example, shifting can be determined based on a shift-pattern corresponding to a driver-selected shifting mode such as economy or power mode. As another example, a driver's driving propensity (for example, a driving propensity index denoting how sportily the driver would like to drive) can be learned, and the learned value can affect alteration of shift-patterns.

However, according to the prior art, an automatic transmission changes its shift-pattern among only a few predetermined shift-patterns. Therefore, further enhancement in reflecting of driving conditions is required. Furthermore, learning a driver's propensity takes a lot of time, so a driver's current propensity and current driving circumstances are not immediately reflected.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Therefore, the motivation for the present invention is to provide non-limiting advantages of more appropriately shifting at a variety of driving circumstances with a shift control method and apparatus of an automatic transmission.

In order to provide such advantages, a shift control method and apparatus of the present invention adjusts a shift-pattern based on a shift-pattern adjusting coefficient calculated by a modular neural network, and determines shifting based on an accordingly adjusted shift-pattern.

An exemplary shift control method useful with the present invention includes: calculating a shift-pattern adjusting coefficient by a modular neural network based on a plurality of input signals input from a plurality of detectors; determining if shifting is required based on an adjusted shift-pattern, the adjusted shift-pattern being adjusted based on the shift-pattern adjusting coefficient; calculating a target shift-speed when shifting is required based on the adjusted shift-pattern; and generating a shifting signal for shifting to the target shift-speed.

In a further embodiment, said calculating a shift-pattern adjusting coefficient by a modular neural network includes: calculating a driving propensity index by a neural network on the basis of at least one first signal selected from the plurality of input signals; calculating a slope index and an effective slope index by a neural network on the basis of at least one second signal selected from the plurality of input signals; calculating a satisfaction index by a neural network on the basis of at least one third signal selected from the plurality of input signals; and calculating the shift-pattern adjusting coefficient on the basis of the driving propensity index, the slope index, the effective slope index, and the satisfaction index.

Said calculating a driving propensity index by a neural network preferably includes: calculating a vehicle load on the basis of at least one signal selected from the first signals; calculating a driver's operating state index by a neural network on the basis of at least one signal selected from the first signals; calculating a kick-down propensity index by a neural network on the basis of at least one signal selected from the first signals; calculating a driver's will index by a neural network on the basis of the driver's operating state index and the kick-down propensity index; and calculating the driving propensity index by a neural network on the basis of the vehicle load and the driver's will index.

Said calculating a vehicle load preferably calculates the vehicle load as a value obtained from an equation of $$Lve = \frac{TE_{acc}}{TE_{\max} - (TE - TE_{acc})}$$

where TE is a torque currently generated by an engine, $TE_{max}$ is a maximum torque of the engine, and $TE_{acc}$ is acceleration torque, the accelerating torque denoting an amount of engine torque needed to accelerate to the currently generated torque TE.

Said calculating a driver's operating state index by a neural network preferably calculates the driver's operating state index on the basis of input signals including throttle opening, throttle opening change rate, brake operation, vehicle speed, and vehicle acceleration signals. The driver's operating state index is preferably calculated selectively from a plurality of predetermined values.

Said calculating a kick-down propensity index by a neural network preferably calculates the kick-down propensity index on the basis of input signals including throttle opening change rate, vehicle speed, and target shift-speed signals. The kick-down propensity index is preferably calculated selectively from a plurality of predetermined values.

Said calculating a slope index and an effective slope index by a neural network preferably includes: calculating a road state index by a neural network on the basis of at least one signal selected from the second signals; calculating an acceleration-deceleration index by a neural network on the basis of at least one signal selected from the second signals; calculating a throttle operation index by a neural network on the basis of at least one signal selected from the second signals; calculating an engine brake requirement index by a neural network on the basis of the acceleration-deceleration index and the throttle operation index; and calculating a slope index and an effective slope index by a neural network on the basis of input signals including the road state index and the engine brake requirement index signals.

Said calculating a road state index preferably calculates the road state index by a neural network on the basis of input signals including vehicle acceleration, vehicle speed, slope resistance, throttle opening, and brake operation signals.

Said calculating an acceleration-deceleration index preferably calculates the acceleration-deceleration index by a neural network on the basis of input signals including throttle opening and vehicle speed signals.

Said calculating a throttle operation index preferably calculates the throttle operation index by a neural network on the basis of input signals including throttle opening, vehicle speed, and duration of the throttle opening signals. The engine brake requirement index is preferably calculated selectively from a plurality of predetermined values.

Said calculating a slope index and an effective slope index by a neural network preferably calculates the slope index and the effective slope index on the basis of input signals further including current shift-speed, target shift-speed, and brake operation signals. Each of the slope index and the effective slope index is preferably calculated selectively from a plurality of predetermined values.

Said calculating a satisfaction index preferably calculates the satisfaction index by a neural network on the basis of input signals including slope index, effective slope index, throttle opening, brake operation, slope resistance, and target shift-speed signals. Said calculating the shift-pattern adjusting coefficient preferably calculates the shift-pattern adjusting coefficient by a monotonic function with respect to the satisfaction index. In more detail, said calculating the shift-pattern adjusting coefficient preferably calculates the shift-pattern adjusting coefficient proportionally to each of the satisfaction index, the driving propensity index, the slope index, and the effective slope index.

Said calculating the shift-pattern adjusting coefficient preferably calculates the shift-pattern adjusting coefficient as a value satisfying an equation "Mp=(Dacc+dd)×Dm +(1−Dm)×Df", where Df is the driving propensity index, Dm is the slope index, Dacc is the effective slope index, and dd is a difference between the satisfaction index and a predetermined value.

Threshold vehicle speeds corresponding to throttle openings are preferably adjusted in the adjusted shift-pattern, where the adjustment of the threshold vehicle speed increases as the throttle opening decreases from a predetermined opening and as the shift-pattern adjusting coefficient increases. In more detail, the adjustment of the threshold vehicle speed is preferably proportional to the shift-pattern adjusting coefficient and to how much smaller the throttle opening is than a predetermined opening.

An exemplary shift control apparatus of an automatic transmission for realizing the exemplary shift control method includes: a detecting unit comprising a plurality of detectors for detecting a plurality of input signals regarding a driving state of a vehicle; a shift control unit, including a modular neural network for calculating a shift-pattern adjusting coefficient based on a plurality of input signals input from the detecting unit, for determining if shifting is required based on an adjusted shift-pattern, the adjusted shift-pattern being adjusted based on the shift-pattern adjusting coefficient, and for calculating a target shift-speed when shifting is required; and an actuator unit for executing shifting to a target shift-speed according to the shifting signal received from the shift control unit. In a further embodiment, the shift control unit includes one or more processors and the modular neural network is implemented in said one or more processors as software.

In another further embodiment, the detecting unit comprises: a vehicle speed detector for detecting a running speed of the vehicle; an engine speed detector for detecting a revolution speed of an engine; a turbine speed detector for detecting a turbine speed, said turbine being included in the automatic transmission; a throttle opening detector for detecting a throttle opening; a brake operation detector for detecting an operation of a brake; and an engine torque detector for detecting a current torque of the engine. The engine torque detector preferably includes a processor for controlling the engine.

In another further embodiment, the modular neural network includes: a first neural network module for calculating a driving propensity index on the basis of at least one of first signals selected from the plurality of input signals; a second neural network module for calculating a slope index and an effective slope index on the basis of at least one of second signals selected from the plurality of input signals; a third neural network module for calculating a satisfaction index on the basis of at least one of third signals selected from the plurality of input signals; and a first calculating module for calculating the shift-pattern adjusting coefficient on the basis of signals received from the first, second, and third neural network modules.

The first neural network module preferably includes: a second calculating module for calculating a vehicle load on the basis of at least one signal selected from the first signals; a fourth neural network module for calculating a driver's operating state index on the basis of at least one signal selected from the first signals; a fifth neural network module for calculating a kick-down propensity index on the basis of at least one signal selected from the first signals; a sixth neural network module for calculating a driver's will index on the basis of the driver's operating state index and the kick-down propensity index; and a seventh neural network module for calculating the driving propensity index on the basis of the vehicle load and the driver's will index.

The second calculating module preferably calculates the vehicle load as a value obtained from an equation $$Lve = \frac{TE_{acc}}{TE_{\max} - (TE - TE_{acc})}$$

where TE is a torque currently generated by an engine, $TE_{max}$ is a maximum torque of the engine, and $TE_{acc}$ is acceleration torque denoting an amount of engine torque used for accelerating to the currently generated torque TE.

The fourth neural network module preferably calculates the driver's operating state index on the basis of input signals including throttle opening, throttle opening change rate, brake operation, vehicle speed, and vehicle acceleration signals. More preferably, the driver's operating state index is calculated selectively from a plurality of predetermined values.

The fifth neural network module preferably calculates the kick-down propensity index on the basis of input signals including throttle opening change rate, vehicle speed, and target shift-speed signals. More preferably, the kick-down propensity index is calculated selectively from a plurality of predetermined values.

The second neural network module preferably includes: an eighth neural network module for calculating a road state index on the basis of at least one signal selected from the second signals; a ninth neural network module for calculating an acceleration-deceleration index on the basis of at least one signal selected from the second signals; a tenth neural network module for calculating a throttle operation index on the basis of at least one signal selected from the second signals; an eleventh neural network module for calculating an engine brake requirement index on the basis of the acceleration-deceleration index and the throttle operation index; and a twelfth neural network module for calculating a slope index and an effective slope index on the basis of input signals including the road state index and the engine brake requirement index.

The eighth neural network module preferably calculates the road state index on the basis of input signals including vehicle acceleration, vehicle speed, slope resistance, throttle opening, and brake operation signals.

The ninth neural network module preferably calculates the acceleration-deceleration index on the basis of input signals including throttle opening and vehicle speed signals.

The tenth neural network module preferably calculates the throttle operation index on the basis of input signals including throttle opening, vehicle speed, and duration of the throttle opening signals.

The engine brake requirement index is preferably calculated selectively from a plurality of predetermined values.

The twelfth neural network module preferably calculates the slope index and the effective slope index on the basis of input signals further including current shift-speed, target shift-speed, and brake operation signals. Each of the slope index and the effective slope index is preferably calculated selectively from a plurality of predetermined values.

The third neural network module calculates the satisfaction index on the basis of input signals including slope index, effective slope index, throttle opening, brake operation, slope resistance, and target shift-speed signals.

The first calculating module preferably calculates the shift-pattern adjusting coefficient by a monotonic function with respect to the satisfaction index. More preferably, the first calculating module calculates the shift-pattern adjusting coefficient proportionally to each of the satisfaction index, the driving propensity index, the slope index, and the effective slope index.

In more detail, the first calculating module preferably calculates the shift-pattern adjusting coefficient as a value satisfying an equation "Mp=(Dacc+dd)×Dm+(1−Dm)×Df", where Df is the driving propensity index, Dm is the slope index, Dacc is the effective slope index, and dd is a difference between the satisfaction index and a predetermined value.

Threshold vehicle speeds corresponding to throttle openings are preferably adjusted in the adjusted shift-pattern, where the adjustment of the threshold vehicle speed increases as the throttle opening decreases from a predetermined opening and as the shift-pattern adjusting coefficient increases. More preferably, the adjustment of the threshold vehicle speed is proportional to the shift-pattern adjusting coefficient and to how much smaller the throttle opening is than a predetermined opening.

The accompanying drawings, which are incorporated in and constitute a part of the specification, illustrate an embodiment of the invention, and, together with the description, serve to explain the principles of the invention:

DETAILED DESCRIPTION OF THE PREFERRED EMBODIMENTS

A preferred embodiment of the present invention will hereinafter be described in detail with reference to the accompanying drawings.

Figure 1:
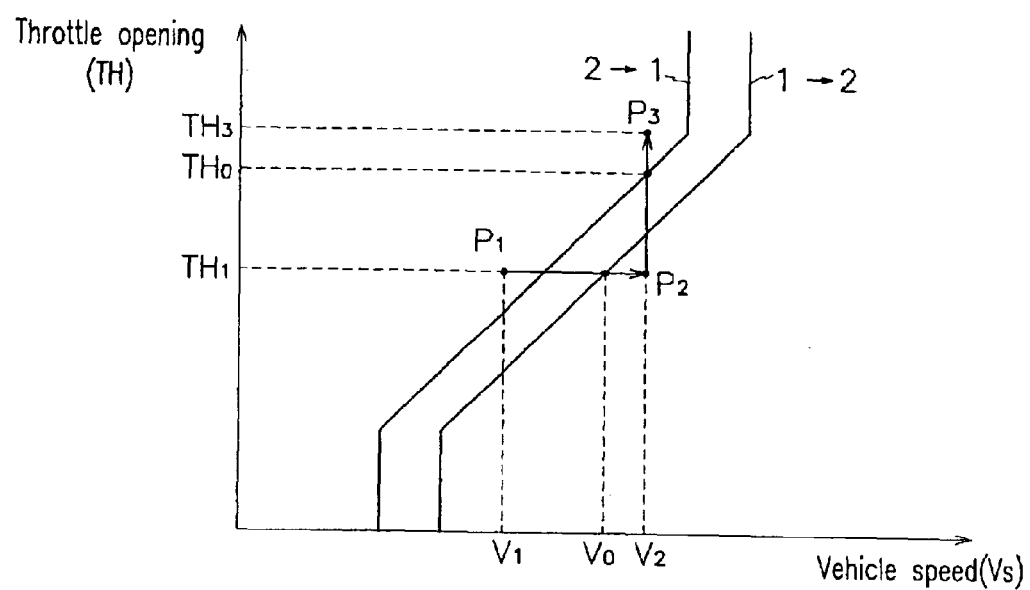
FIG. 1 shows usual shift-patterns for 1->2 upshift and 2->1 downshift.
Figure 2:
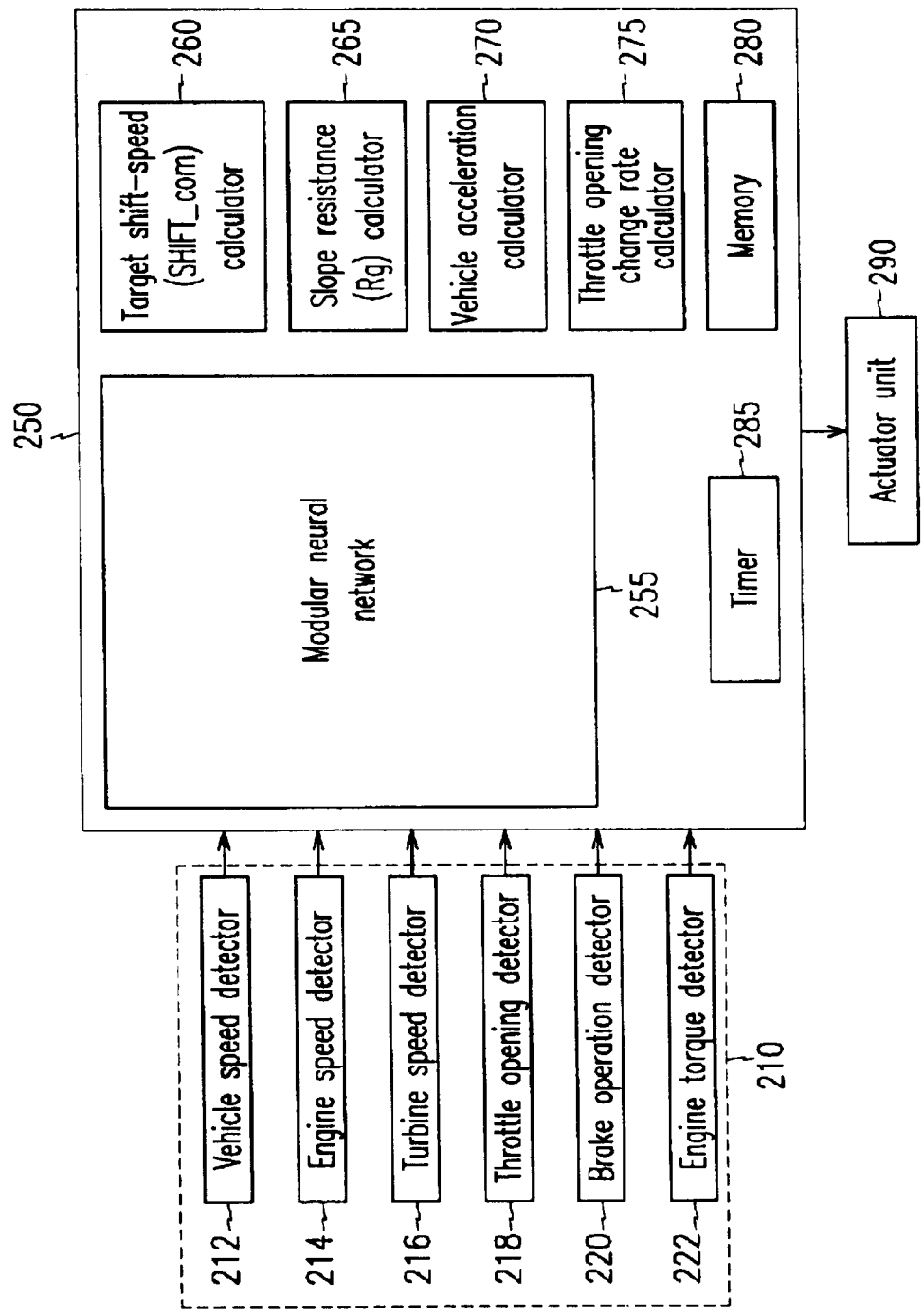
FIG. 2 is a block diagram of a shift control apparatus of an automatic transmission according to a preferred embodiment of the present invention.

As shown in FIG. 2, a shift control apparatus of an automatic transmission according to a preferred embodiment of the present invention includes a detecting unit 210 including a plurality of detectors for detecting a plurality of input signals regarding a driving state of a vehicle. The shift control apparatus also includes shift control unit 250 for determining if shifting is required based on the input signals and generating a shifting signal when shifting is required. The shift control apparatus further includes an actuator unit 290 for executing shifting to a target shift-speed according to the shifting signal received from the shift control unit 250.

The actuator unit 290 preferably includes a plurality of solenoid valves. The actuator unit 290 is also preferably dependant on various schemes of automatic transmissions. However, for any specific automatic transmission, a corresponding actuator unit 290 can be used, as is well understood by a person skilled in the art.

The detecting unit 210 preferably includes a vehicle speed detector 212 for detecting a running speed of the vehicle (not shown); an engine speed detector 214 for detecting a revolution speed of an engine; a turbine speed detector 216 for detecting a turbine speed, said turbine forming part of the automatic transmission; a throttle opening detector 218 for detecting a throttle opening; a brake operation detector 220 for detecting an operation of a brake; and an engine torque detector 222 for detecting a current torque of the engine.

The vehicle speed detector 212 is preferably a sensor for detecting rotational speed of an output shaft of the automatic transmission, and the brake operation detector 220 is preferably a switch that is either connected or opened when the brake is operated by a driver. The engine torque detector 222 is preferably included in a processor for controlling the engine. Calculating and storing an engine torque at the processor is well known by those skilled in the art. The engine speed detector 214, the turbine speed detector 216, and the throttle opening detector 218 are also well known to those skilled in the art, and therefore further detailed description is minimized.

The shift control unit 250 is preferably one or more processors activated by predetermined software. A memory 280 is coupled to the processors of the shift control unit 250 for storing parameter values, such as a current shift-speed and a previous shift-speed of the automatic transmission.

The processors for the shift control unit 250 preferably include: a target shift-speed calculator 260 for calculating a target shift-speed according to a current shift-pattern; a slope resistance calculator 265 for calculating slope resistance (Rg) of a road; a vehicle acceleration calculator 270 for calculating vehicle acceleration (Va) from input vehicle speeds (Vs); and a throttle opening change rate calculator 275 for calculating throttle opening change rate (TH) from input throttle opening values (TH). The target shift-speed calculator 260, the slope resistance calculator 265, and the vehicle acceleration calculator 270 may be realized either by hardware or software. Calculating the target shift-speed of the target shift-speed calculator 260 and calculating vehicle acceleration of the vehicle acceleration calculator 270 are well known to those skilled in the art. Also, when a road has a slope, a portion of output torque of an engine is not used for acceleration, but rather it is used for resisting gravitation induced by the slope. Therefore, the slope resistance (Rg) denotes the amount of output torque of the engine used for resisting gravitation, calculated in terms of slope. Calculating the output torque used for resisting gravitation in terms of slope is well known to those skilled in the art.

The shift control unit 250 calculates a shift-pattern adjusting coefficient (Mp) by a modular neural network 255 on the basis of signals input from the detecting unit 210. A preferred functional structure of the modular neural network 255 is described in detail hereinafter with reference to FIG. 3.

Figure 3:
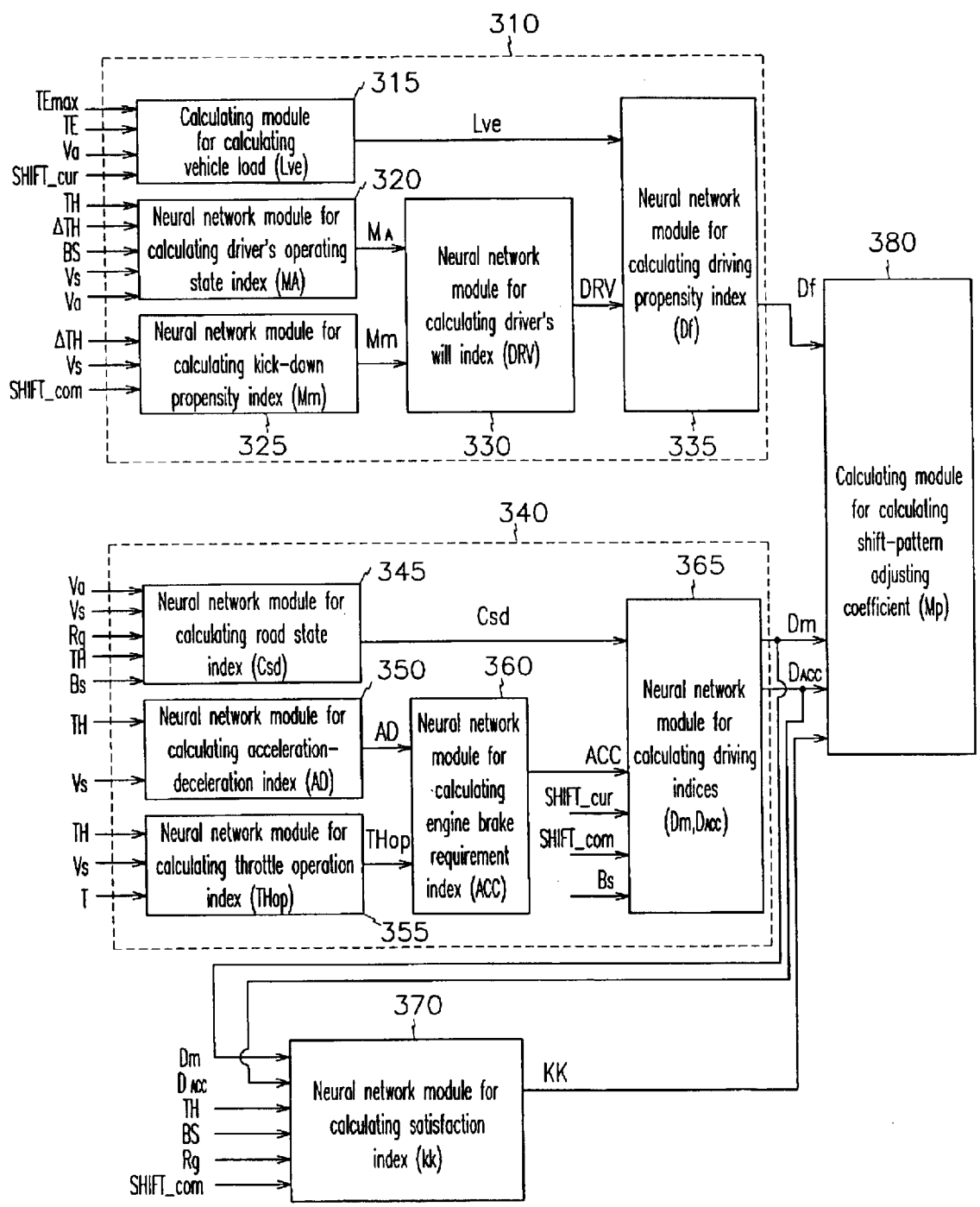
FIG. 3 is a detailed block diagram of a modular neural network adopted in a shift control apparatus of an automatic transmission according to a preferred embodiment of the present invention.

As shown in FIG. 3, the modular neural network 255 (FIG. 2) includes a plurality of neural network modules. The modular neural network includes: a first neural network module 310 for calculating a driving propensity index (Df) on the basis of at least one of first signals selected from the plurality of input signals received from the detecting unit 210 (FIG. 2); a second neural network module 340 for calculating a slope-index and an effective slope index (Dacc) on the basis of at least one of second signals selected from the plurality of input signals received from the detecting unit 210 (FIG. 2); and a third neural network module 370 for calculating a satisfaction index (kk) on the basis of at least one of third signals selected from the plurality of input signals received from the detecting unit 210 (FIG. 2).

The modular neural network 255 further includes a first calculating module 380 for calculating the shift-pattern adjusting coefficient (Mp) on the basis of signals received from the first, second, and third neural network modules 310, 340, and 370.

Use of a neural network 255 that includes a plurality of neural network modules, as described above, reduces the neural network's learning period and increases the precision of the neural network.

The first, second, and third neural network modules 310, 340, and 370, and the first calculating module 380 may be realized as either hardware or software. Preferably, they are programmed into the shift control unit 250.

The terms "driving propensity index", "slope index", "effective slope index", and "satisfaction index" are introduced in order to enhance understanding of the present invention and its preferred embodiment, and therefore, they should not be understood as limiting the scope of the present invention except through their differentiation of the indices.

The first neural network module 310 receives signals including those of a maximum torque (TEmax) of the engine, a current engine torque (TE), a vehicle speed (Vs), a vehicle acceleration (Va), a current shift-speed (SHIFT_cur), a throttle opening(TH), a throttle opening change rate ( TH), a brake operation signal (BS), and a target shift-speed (SHIFT_com) according to a current shift-pattern. The maximum torque (TEmax) and the current shift-speed (SHIFT_cur) signals are retrieved from the memory 280 (FIG. 2). The current engine torque (TE) is input from the engine torque detector 222 (FIG. 2), the vehicle speed (Vs) from the vehicle speed detector 212 (FIG. 2), the vehicle acceleration (Va) from the vehicle acceleration calculator 270 (FIG. 2), the throttle opening (TH) from the throttle opening detector 218 (FIG. 2), the throttle opening change rate (TH) from the throttle opening change rate calculator 275 (FIG. 2), the throttle operation signal (BS) from the brake operation detector 220 (FIG. 2), and the target shift-speed (SHIFT_com) according to the current shift-pattern from the target shift-speed calculator 260, respectively.

As described above, parameters closely related to a driver's driving characteristics are chosen as signals input to the first neural network module 310 such that the driver's driving characteristics can be fully considered.

In more detail, the first neural network module 310 includes: a second calculating module 315 for calculating a vehicle load (Lve); a fourth neural network module 320 for calculating a driver's operating state index (MA); a fifth neural network module 325 for calculating a kick-down propensity index (Mm); a sixth neural network module 330 for calculating a driver's will index (DRV) on the basis of the driver's operating state index (MA) and the kick-down propensity index (Mm); and a seventh neural network module 335 for calculating the driving propensity index (Df) on the basis of the vehicle load and the driver's will index (DRV).

The vehicle load is calculated as shown if the following equation 1.

$$Lve = \frac{TE_{acc}}{TE_{\max} - (TE - TE_{acc})} \qquad \text{equation 1}$$

Here, TE is the torque currently generated by an engine, TEmax is a maximum torque of the engine, and TEacc is acceleration torque, denoting an amount of engine torque used to accelerate to the currently generated torque TE.

The acceleration torque (TEacc) is preferably calculated from an acceleration resistance and a shift-ratio of the current shift-speed (SHIFT_cur), where the acceleration resistance is defined as a multiplication of a vehicle acceleration (Va) and a mass (M) of the vehicle.

The terms "driver's operating state index", "kick-down propensity index", and "driver's will index" are introduced in order to enhance understanding of the present invention and its preferred embodiment, and therefore, they should not be understood as limiting the scope of the present invention except through their differentiation of the indices.

The fourth neural network module 320 calculates the driver's operating state index (MA) on the basis of input signals including throttle opening (TH), throttle opening change rate (TH), brake operation (BS), vehicle speed (Vs), and vehicle acceleration (Va) signals. As described above, parameters closely related to a driver's operating state are chosen as signals input to the fourth neural network module 320 such that the driver's operating state can be precisely considered. The driver's operating state index (MA) is calculated selectively from a plurality of predetermined values, for example, "dynamic", "normal", and "economy".

The fifth neural network module 325 calculates the kick-down propensity index (Mm) on the basis of input signals including throttle opening change rate (TH), vehicle speed (Vs), and target shift-speed (SHIFT_com) signals. It should be obvious to a person skilled in the art that reliability is enhanced because parameters closely related to occurrence of kick-down shifting are chosen as signals input to the fifth neural network module 325 such that the kick-down propensity can be precisely considered. The kick-down propensity index (Mm) is calculated selectively from a plurality of predetermined values, for example, "large", "intermediate", and "small".

The sixth neural network module 330 calculates the driver's will index (DRV) on the basis of the driver's operating state index (MA) and the kick-down propensity index (Mm). The driver's operating state index (MA) is calculated as an index of a driver's acceleration and deceleration operation, and the kick-down propensity index (Mm) is calculated as an index of a driver's kick-down propensity. Therefore a shift-pattern adjusting coefficient reflects various aspects of a driver's driving characteristics.

The seventh neural network module 335 calculates the driving propensity index (Df) on the basis of not only the driver's will index (DRV), but also the current vehicle load (Lve). Therefore, precise determination of the driving propensity index (Df) is possible because the vehicle load is also considered as well as a parameter related to a driver's operation of the vehicle.

The fourth, fifth, sixth, and seventh neural network modules 320, 325, 330, and 335 calculate corresponding indices on the basis of corresponding inputs. Training the neural network modules 320–335 may occur using a variety of training sequences and training processes based on such training sequences, both of which are well known by those skilled in the art.

A driver's driving propensity is precisely considered by the first neural network module 310 described above. For example, in the case that a driver, having a dynamic propensity, would like to achieve rapid acceleration when a vehicle is running at 70 km/h using 50% of maximum engine torque, the driver would rapidly operate the throttle valve. In this case, the transmission should be able to provide better output torque to the drive wheels. In this case, driving conditions are input to component neural network modules of the first neural network module 310, and accordingly, the driver's operating state index (MA) will indicate "dynamic", and the kick-down propensity index will indicate that the driver's kick-down propensity is large, i.e., the driver typically shifts down. Accordingly, the driver's will index (DRV) will indicate a situation requiring more driving torque, and this driver's will index (DRV) adjoined by the calculated vehicle load (Lve) is considered to calculate the driving propensity index (Df) at the seventh neural network module 335.

As shown above, the first neural network module 310 is modularized appropriately to actual driving situations, and it therefore enables accurate and precise shift control of an automatic transmission for satisfying a driver's requirements.

The second neural network module 340 receives signals including: those of the vehicle speed (Vs), the vehicle acceleration (Va), the slope resistance (Rg), the throttle opening (TH), and the duration (T) of the throttle opening (TH). The duration (T) is input from a timer 285 (FIG. 2) such that the second neural network module 340 can consider how frequently the throttle valve is operated. The vehicle speed (Vs) is input from the vehicle speed detector 212 (FIG. 2), the vehicle acceleration (Va) from the vehicle acceleration calculator 270 (FIG. 2), the slope resistance (Rg) from the slope resistance calculator 265 (FIG. 2), and the throttle opening TH from the throttle opening detector 218 (FIG. 2), respectively.

As described above, parameters closely related to road state and driver's driving conditions are chosen as signals input to the second neural network module 340 such that the road state and driving conditions can be fully considered.

In more detail, the second neural network module 340 includes: an eighth neural network module 345 for calculating a road state index (Csd), a ninth neural network module 350 for calculating an acceleration-deceleration index (AD); a tenth neural network module 355 for calculating a throttle operation index (THop); an eleventh neural network module 360 for calculating an engine brake requirement index (ACC), on the basis of the acceleration-deceleration index (AD) and the throttle operation index (THop); and a twelfth neural network module 365 for calculating a slope index (Dm) and an effective slope index (Dacc), on the basis of input signals including the road state index (Csd) and the engine brake requirement index (ACC).

The terms "road state index", "acceleration-deceleration index", "throttle operation index", and "engine brake requirement index" are introduced in order to enhance understanding of the present invention and its preferred embodiment, and therefore, they should not be understood as limiting the scope of the present invention except through their differentiation of the indices.

The eighth neural network module 345 calculates the road state index (Csd) on the basis of input signals including vehicle acceleration (Va), vehicle speed (Vs), slope resistance (Rg), throttle opening (TH), and brake operation (BS) signals. Parameters related to driver's operation as well as the slope resistance (Rg) are included as input signals such that determining of the road state becomes more applicable.

The ninth neural network module 350 calculates the acceleration-deceleration index (AD) on the basis of input signals including a throttle opening (TH) and a vehicle speed (Vs). The throttle opening (TH), a degree of operation by a driver, may depend on the vehicle speed (Vs), which is reflected in input signals of the ninth neural network module 350, and therefore the ninth neural network module 350 precisely determines how much acceleration or deceleration is required by the driver. The acceleration-deceleration index (AD) is calculated selectively from a plurality of predetermined values.

The tenth neural network module 355 calculates the throttle operation index (THop) on the basis of input signals including those of the throttle opening (TH), the vehicle speed (Vs), and the duration (T) of throttle opening (TH). Therefore, the duration (T) of throttle operation is also considered as well as the instantaneous amount of throttle opening (TH).

As described above, the eleventh neural network module 360 calculates an engine brake requirement index (ACC) on the basis of the acceleration-deceleration index (AD) and the throttle operation index (THop).

The current road state is more stabley determined because the throttle operation index (THop) is considered as well as the acceleration-deceleration index (AD).

In the case that a vehicle is running on a slope, enhanced driving torque is required when the vehicle is climbing up the slope, and engine braking is required when the vehicle is running down the slope. Therefore, the throttle operation index (THop) and the acceleration-deceleration index (AD) are considered to determine the engine brake requirement index (ACC), and accordingly, a shift-pattern adjusting coefficient is more appropriately determined based on such an engine brake requirement index (ACC).

The engine brake requirement index (ACC) is calculated selectively from a plurality of predetermined values, one example being "existing" or "non-existing" deceleration will of a driver, and another example being "large", "intermediate", and "small" deceleration will of a driver.

The twelfth neural network module 365 calculates the slope index (Dm) and the effective slope index (Dacc) on the basis of input signals further including current shift-speed (SHIFT_cur), target shift-speed (SHIFT_com), and brake operation (BS) signals.

Therefore, parameters such as the road state index (Csd) related to a slope of a road, the vehicle speed (Vs), a driver's throttle operation (TH), and the duration (T) of the driver's throttle operation are considered together such that the two indices (Dm and Dacc) are reasonably calculated.

The slope index (Dm) and the effective slope index (Dacc) may have arbitrary meanings preferred by a person skilled in the art, but it is preferable here that the slope index (Dm) denotes an actual slope of a road, and that the effective slope index (Dacc) denotes an index, in terms of a predetermined scale, for a driver-felt slope.

Even in the case that a vehicle is running on a slope, a shift-pattern for different driving circumstances (for example, a shift-pattern for a flat road) is appropriate when the driver has a will for acceleration. Therefore, the driver-felt slope is introduced in order to fully consider the driver's driving operation in calculation of the shift-pattern adjusting coefficient.

Each of the slope index (Dm) and the effective slope index (Dacc) are calculated selectively from a plurality of predetermined values, for example 0 or 1, according to existence of a slope.

The eighth, ninth, tenth, eleventh, and twelfth neural network modules 345, 350, 355, 360, and 365 are trained to calculated corresponding indices on the basis of corresponding inputs. Training the neural network modules 345–365 may occur using a variety of training sequences and training processes based on such training sequences, both of which are well known to those skilled in the art. As shown above, the second neural network module 340 is modularized appropriately to consider a driver's driving operation, current and calculated shift-speeds, and brake operation, as well as an actual slope of the running road, and it therefore enables precise determination of a driving state of the vehicle.

The third neural network module 370 calculates the satisfaction index (kk) on the basis of input signals including those of the slope index (Dm) and the effective slope index (Dacc) calculated by the second neural network module 340, the throttle opening (TH), the brake operation signal (BS), the slope resistance (Rg), and the target shift-speed (SHIFT_com) according to a current shift-pattern. The throttle opening (TH) is input from the throttle opening detector 218 (FIG. 2), the brake operation signal (BS) from the brake operation detector 220 (FIG. 2), the slope resistance (Rg) from the slope resistance calculator 265 (FIG. 2), and the target shift-speed (SHIFT_com) according to the current shift-pattern from target shift-speed calculator 260.

The satisfaction index (kk) is introduced in order to compensate for dissatisfaction that may occur when a shift-pattern is adjusted on the basis of only the signals from the first and second neural network modules 310 and 340. How the satisfaction index (kk) affects the calculation of shift-pattern adjusting coefficient is described later in connection with the detailed description of the first calculating module 380.

The third neural network module 370 calculates the satisfaction index (kk) on the basis of parameters TH, BS, and Rg denoting the running state and the target shift-speed (SHIFT_com), in addition to indices (Dm and Dacc) calculated by the second neural network modules 340, which enables appropriate scaling of a driver's satisfaction. The third neural network modules 370 is trained to calculate corresponding indices on the basis of corresponding inputs. Training the third neural network module 370 may occur using a variety of training sequences and training processes based on such training sequences, both of which are well known by those skilled in the art.

As described above, the first calculating module 380 calculates the shift-pattern adjusting coefficient (Mp) on the basis of signals received from the first, second, and third neural network modules 310, 340, and 370.

In more detail, the first calculating module 380 calculates the shift-pattern adjusting coefficient (Mp) as a value satisfying the following equation 2.

$$Mp=(Dacc+dd)Dm+Df(1-Dm), \quad \text{Equation 2}$$

where Df is the driving propensity index, Dm is the slope index, Dacc is the effective slope index, and dd is a difference between the satisfaction index (kk) and a predetermined value.

Accordingly, the first calculating module 380 calculates the shift-pattern adjusting coefficient (Mp) by a monotonic function with respect to the satisfaction index (kk). In more detail, the first calculating module 380 calculates the shift-pattern adjusting coefficient (Mp) proportionally to each of the satisfaction index (kk), the driving propensity index (Df), the slope index (Dm), and the effective slope index (Dacc).

Figure 4:
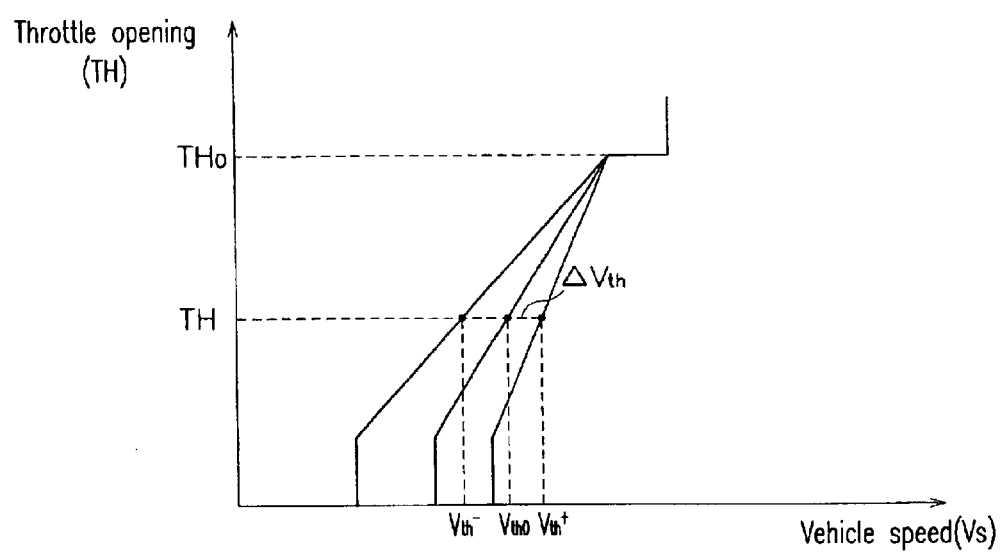
FIG. 4 illustrates how a shift-pattern is adjusted by a shift-pattern adjusting coefficient according to a preferred embodiment of the present invention.

FIG. 4 illustrates how a shift-pattern is adjusted by a shift-pattern adjusting coefficient according to a preferred embodiment of the present invention. As shown in FIG. 4, adjusting a shift-pattern can be realized as adjusting threshold vehicle speeds corresponding to throttle openings.

According to a preferred embodiment of the present invention, the threshold vehicle speeds corresponding to throttle openings are adjusted in the adjusted shift-pattern, and the adjustment (Vth) of the threshold vehicle speed increases as the throttle opening (TH) decreases from a predetermined opening (TH0) and as the shift-pattern adjusting coefficient (Mp) increases.

In more detail, the adjustment (Vth) of the threshold vehicle speed is proportional to the shift-pattern adjusting coefficient (Mp) and to how much smaller the throttle opening (TH) is than a predetermined opening (TH0).

Figure 5:
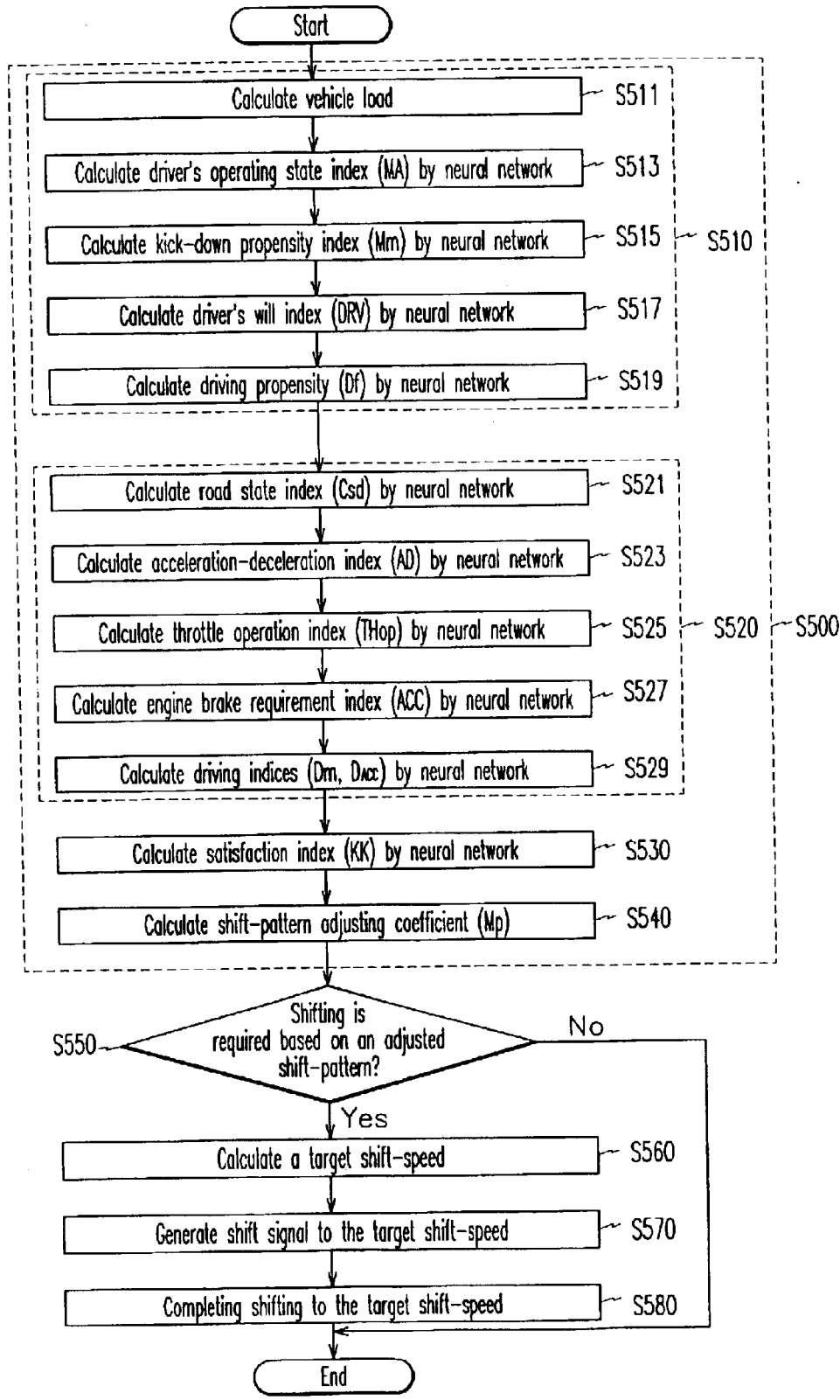
FIG. 5 is a flowchart for showing a shift control method of an automatic transmission according to a preferred embodiment of the present invention.

A shift control method of an automatic transmission according to a preferred embodiment of the present invention is hereinafter described in detail with reference to FIG. 5.

Firstly, the shift control unit 250 calculates the shift-pattern adjusting coefficient (Mp) by a modular neural network on the basis of a plurality of input signals input from a plurality of detectors 212–222 at step S500. When the shift-pattern adjusting coefficient (Mp) is calculated at step S500, the shift control unit 250 determines, at step S550, if shifting is required based on an adjusted shift-pattern, the adjusted shift-pattern being adjusted based on the shift-pattern adjusting coefficient (Mp).

When shifting is required based on the adjusted shift-pattern, the shift control unit 250 calculates a target shift-speed at step S560, and accordingly generates shifting signals for shifting to the target shift-speed at step S570. According to the shifting signals from the shift control unit 250, the actuator unit 290 (FIG. 2) is driven and accordingly the target shift-speed is achieved at step S580.

The step S500 of calculating a shift-pattern adjusting coefficient (Mp) by a modular neural network includes: a step S510 of calculating a driving propensity index (Df) by a neural network on the basis of at least one first signal selected from the plurality of input signals; a step S520 of calculating a slope index (Dm) and an effective slope index (Dacc) by a neural network on the basis of at least one second signal selected from the plurality of input signals; a step S530 of calculating a satisfaction index (kk) by a neural network on the basis of at least one third signal selected from the plurality of input signals; and a step S540 of calculating the shift-pattern adjusting coefficient (Mp) on the basis of the driving propensity index (Df), the slope index (Dm), the effective slope index (Dacc), and the satisfaction index (kk).

The step S510 is performed at the first neural network module 310 (FIG. 3), the step S520 at the second neural network module 340 (FIG. 3), the step S530 at the third neural network module 370 (FIG. 3), and the step S540 at the first calculation module 380 (FIG. 3), respectively.

The step S510 of calculating a driving propensity index (Df) by a neural network includes: a step S511 of calculating a vehicle load (Lve) on the basis of at least one signal selected from the first signals; a step S513 of calculating a driver's operating state index (MA) by a neural network on the basis of at least one signal selected from the first signals; a step S515 of calculating a kick-down propensity index by a neural network on the basis of at least one signal selected from the first signals; a step S517 of calculating a driver's will index (DRV) by a neural network on the basis of the driver's operating state index (MA) and the kick-down propensity index (Mm); and a step S519 of calculating the driving propensity index (Df) by a neural network on the basis of the vehicle load (Lve) and the driver's will index (DRV).

The step S511 is performed at the second calculating module 315 (FIG. 3), the step S513 at the fourth neural network module 320 (FIG. 3), the step S515 at the fifth neural network module 325 (FIG. 3), the step S517 at the sixth neural network module 330 (FIG. 3), and the step S519 at the seventh neural network module 335 (FIG. 3), respectively. At step S511, the vehicle load (Lve) is calculated by the equation 1. The step S513 of calculating the driver's operating state index (MA), is undertaken by the fourth neural network 320 (FIG. 3) calculating the driver's operating state index (MA) on the basis of input signals including throttle opening (TH), throttle opening change rate (TH), brake operation (BS), vehicle speed (Vs), and vehicle acceleration (Va) signals. The driver's operating state index (MA) is calculated selectively from a plurality of predetermined values, for example, "dynamic", "normal", and "economy". The step S515 of calculating the kick-down propensity index (Mm), is undertaken by the fifth neural network 325 (FIG. 3) calculating the kick-down propensity index (Mm) on the basis of input signals including throttle opening change rate (TH), vehicle speed (Vs), and target shift-speed (SHIFT_com) signals. The kick-down propensity index (Mm) is calculated selectively from a plurality of predetermined values, for example, "large", "intermediate", and "small".

The step S520 of calculating the slope index (Dm) and the effective slope index (Dacc) includes: a step S521 of calculating a road state index (Csd) by a neural network on the basis of at least one signal selected from the second signals; a step S523 of calculating an acceleration-deceleration index (AD) by a neural network on the basis of at least one signal selected from the second signals; a step S525 of calculating a throttle operation index (THop) by a neural network on the basis of at least one signal selected from the second signals; a step S527 of calculating an engine brake requirement index (ACC) by a neural network on the basis of the acceleration-deceleration index (AD) and the throttle operation index (THop); and a step S529 of calculating a slope index (Dm) and an effective slope index (Dacc) by a neural network on the basis of input signals including the road state index (Csd) and the engine brake requirement index (ACC).

The step S521 is performed at the eighth neural network module 345 (FIG. 3), the step S523 at the ninth neural network module 350 (FIG. 3), the step S525 at the tenth neural network module 355 (FIG. 3), the step S527 at the eleventh neural network module 360 (FIG. 3), and the step S519 at the twelfth neural network module 365 (FIG. 3), respectively.

At step S521, the road state index (Csd) is calculated on the basis of input signals including vehicle acceleration (Va), vehicle speed (Vs), slope resistance (Rg), throttle opening (TH), and brake operation (BS) signals. At step S523, the acceleration-deceleration index (AD) is calculated on the basis of input signals including throttle opening (TH) and vehicle speed (Vs) signals. At step S525, the throttle operation index (THop) is calculated on the basis of input signals including throttle opening (TH), vehicle speed (Vs), and duration (T) of the throttle opening (TH) signals. At step S527, the engine brake requirement index (ACC) is calculated selectively from a plurality of predetermined values, one example being "existing" or "non-existing" deceleration will of a driver, and another example being "large", "intermediate", and "small" deceleration will of a driver.

The step S529 of calculating the slope index (Dm) and the effective slope index (Dacc) is undertaken by the twelfth neural network module 365 (FIG. 3), which calculates the slope index (Dm) and the effective slope index (Dacc) on the basis of input signals further including current shift-speed (SHIFT_cur), target shift-speed (SHIFT_com), and brake operation (BS) signals. Each of the slope index (Dm) and the effective slope index (Dacc) is calculated selectively from a plurality of predetermined values, for example, 0 or 1, according to existence of a slope.

The step S530 of calculating a satisfaction index (kk) is undertaken by the third neural network module 370 which calculates the satisfaction index (kk) on the basis of input signals including slope index (Dm), effective slope index (Dacc), throttle opening (TH), brake operation (Bs), slope resistance (Rg), and target shift-speed (SHIFT_com) signals. The step S540 of calculating the shift-pattern adjusting coefficient (Mp), the first calculating module 380 calculates the shift-pattern adjusting coefficient (Mp) according to equation 2. That is, the shift-pattern adjusting coefficient (Mp) is calculated by a monotonic function with respect to the satisfaction index (kk). In more detail, the coefficient Mp is proportional to each of the satisfaction index (kk), the driving propensity index (Df), the slope index (Dm), and the effective slope index (Dacc).

When the shift-pattern adjusting coefficient (Mp) is calculated at step S540, the shift-control unit 250 (FIG. 2) determines at step S550 if shifting is required based on an adjusted shift-pattern, the adjusted shift-pattern being adjusted based on the shift-pattern adjusting coefficient (Mp).

Threshold vehicle speeds corresponding to throttle openings are adjusted in the adjusted shift-pattern, and the adjustment (Vth) of the threshold vehicle speed increases as the throttle opening (TH) decreases from a predetermined opening (TH0) and as the shift-pattern adjusting coefficient (Mp) increases. In more detail, the adjustment (Vth) of the threshold vehicle speed is proportional to the shift-pattern adjusting coefficient (Mp) and to how much smaller the throttle opening (TH) is than a predetermined opening (TH0).

When shifting is required based on the adjusted shift-pattern, the shift control unit 250 calculates a target shift-speed at step S560, and accordingly generates shifting signals for shifting to the target shift-speed at step S570.

According to the shifting signals from the shift control unit 250, the actuator unit 290 is driven and accordingly the target shift-speed is achieved at step S580.

According to a preferred embodiment of the present invention, a shift-pattern is appropriately adjusted to various driving circumstances and conditions. In particular, a shift-pattern adjusting coefficient is calculated by a modular neural network. Therefore, a shift-pattern can be appropriately adjusted even when the vehicle is running under unexpected driving circumstances and conditions. Furthermore, the modular structure of the neural network simplifies its calculation and enhances accuracy thereof.

Furthermore, the modular structure of the neural network reduces the total number of cases to be used to train the whole neural network because each neural network module can be trained. Input signals are grouped to have physical relevance and are provided to component neural network modules, and therefore reliability in calculation of modular neural networks is enhanced.

According to a shift-pattern adjusting coefficient calculated by a modular neural network, the utility of adjusting a shift-pattern is increased because the shift-pattern can be adjusted extremely, when encountering extreme driving circumstances.

It should be appreciated that many of the values described herein, such as Ma, Mm, Dev, Df, Csd, Ad, THop, Acc, Dm, Dacc, Tkk, are calculated using a neural network based on input value(s). The relations between input and output values generally cannot be expressed mathematically because the relation is determined as a result of the experience of the neural network. In other words, the neural network must learn (or must be trained to learn) the relation of input and output values before it can evaluate output value(s) based on input values(s). How the neural network learns (training process) and what kind of data is used in the training of the neural network (training sequence) is well understood by those skilled in the art.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A shift control method of an automatic transmission, comprising:
    calculating a shift-pattern adjusting coefficient by a modular neural network based on a plurality of input signals input from a plurality of detectors;
    determining if shifting is required based on an adjusted shift-pattern, the adjusted shift-pattern being adjusted based on the shift-pattern adjusting coefficient;
    calculating a target shift-speed when shifting is required based on the adjusted shift-pattern; and
    generating a shifting signal for shifting to the target shift-speed;
        wherein said calculating a shift-pattern adjusting coefficient by a modular neural network comprises;
        calculating a driving propensity index by a neural network on the basis of at least one first signal selected from the plurality of input signals;
        calculating a slope index and an effective slope index by a neural network on the basis of at least one second signal selected from the plurality of input signals;
        calculating a satisfaction index by a neural network on the basis of at least one third signal selected from the plurality of input signals; and
        calculating the shift-pattern adjusting coefficient on the basis of the driving propensity index, the slope index, the effective slope index, and the satisfaction index.

2. The shift control method of claim 1, wherein threshold vehicle speeds corresponding to throttle openings are adjusted in the adjusted shift-pattern, where the adjustment of the threshold vehicle speed is proportional to the shift-pattern adjusting coefficient and to how much smaller a throttle opening is than a predetermined opening.

3. The shift control method of claim 1, wherein said calculating a driving propensity index by a neural network comprises:
    calculating a vehicle load on the basis of at least one signal selected from the at least one first signal;
    calculating a driver's operating state index by a neural network on the basis of at least one signal selected from the first signals;
    calculating a kick-down propensity index by a neural network on the basis of at least one signal selected from the first signals;
    calculating a driver's will index by a neural network on the basis of the driver's operating state index and the kick-down propensity index; and
    calculating the driving propensity index by a neural network on the basis of the vehicle load and the driver's will index.

4. The shift control method of claim 3, wherein said calculating a vehicle load calculates the vehicle load as a value obtained from an equation $$4Lve = TEaccTEmax - (TE - TEacc),$$

where TE is a torque currently generated by an engine, TEmax is a maximum torque of the engine, and TEacc is acceleration torque denoting an amount of engine torque used to accelerate to the torque currently generated TE.

5. The shift control method of claim 3, wherein said calculating a driver's operating state index by a neural network calculates the driver's operating state index on the basis of input signals including throttle opening, throttle opening change rate, brake operation, vehicle speed, and vehicle acceleration signals.

6. The shift control method of claim 3, wherein the driver's operating state index is calculated selectively from a plurality of predetermined values.

7. The shift control method of claim 3, wherein said calculating a kick-down propensity index by a neural network calculates the kick-down propensity index on the basis of input signals including throttle opening change rate, vehicle speed, and target shift-speed signals.

8. The shift control method of claim 7, wherein the kick-down propensity index is calculated selectively from a plurality of predetermined values.

9. The shift control method of claim 1, wherein said calculating a slope index and an effective slope index by a neural network comprises:
   calculating a road state index by a neural network on the basis of at least one signal selected from the at least one second signal;
   calculating an acceleration-deceleration index by a neural network on the basis of at least one signal selected from the second signals;
   calculating a throttle operation index by a neural network on the basis of at least one signal selected from the second signals;
   calculating an engine brake requirement index by a neural network on the basis of the acceleration-deceleration index and the throttle operation index; and
   calculating a slope index and an effective slope index by a neural network on the basis of input signals including the road state index and the engine brake requirement index.

10. The shift control method of claim 9, wherein said calculating a road state index calculates the road state index by a neural network on the basis of input signals including vehicle acceleration, vehicle speed, slope resistance, throttle opening, and brake operation signals.

11. The shift control method of claim 9, wherein said calculating an acceleration-deceleration index calculates the acceleration-deceleration index by a neural network on the basis of input signals including throttle opening and vehicle speed signals.

12. The shift control method of claim 9, wherein said calculating a throttle operation index calculates the throttle operation index by a neural network on the basis of input signals including throttle opening signals, vehicle speed signals, and duration of the throttle opening signals.

13. The shift control method of claim 9, wherein the engine brake requirement index is calculated selectively from a plurality of predetermined values.

14. The shift control method of claim 9, wherein said calculating a slope index and an effective slope index by a neural network calculates the slope index and the effective slope index on the basis of input signals further including current shift-speed, target shift-speed, and brake operation signals.

15. The shift control method of claim 9, wherein each of the slope index and the effective slope index is calculated selectively from a plurality of predetermined values.

16. The shift control method of claim 1, wherein said calculating a satisfaction index calculates the satisfaction index by a neural network on the basis of input signals including slope index, effective slope index, throttle opening, brake operation signal, slope resistance, and target shift-speed signals.

17. The shift control method of claim 1, wherein said calculating the shift-pattern adjusting coefficient calculates the shift-pattern adjusting coefficient by a monotonic function with respect to the satisfaction index.

18. The shift control method of claim 1, wherein said calculating the shift-pattern adjusting coefficient calculates the shift-pattern adjusting coefficient proportionally to each of the satisfaction index, the driving propensity index, the slope index, and the effective slope index.

19. The shift control method of claim 1, wherein said calculating the shift-pattern adjusting coefficient calculates the shift-pattern adjusting coefficient as a value satisfying an equation "$Mp=(Dacc+dd) \times Dm+(1-Dm) \times Df$", where Df is the driving propensity index, Dm is the slope index, Dacc is the effective slope index, and dd is a difference between the satisfaction index and a predetermined value.

20. The shift control method of claim 1, wherein threshold vehicle speeds corresponding to throttle openings are adjusted in the adjusted shift-pattern, where the adjustment of the threshold vehicle speed increases as the throttle opening decreases from a predetermined opening and as the shift-pattern adjusting coefficient increases.

21. A shift control apparatus of an automatic transmission comprising:
   a detecting unit comprising a plurality of detectors for detecting a plurality of input signals regarding a driving state of a vehicle;
   a shift control unit, including a modular neural network for calculating a shift-pattern adjusting coefficient based on a plurality of input signals input from the detecting unit, for determining if shifting is required based on an adjusted shift-pattern, the adjusted shift-pattern being adjusted based on the shift-pattern adjusting coefficient, and for calculating a target shift-speed when shifting is required; and
   an actuator unit for executing shifting to the target shift-speed according to the shifting signal received from the shift control unit;
   wherein the modular neural network comprises:
      a first neural network module for calculating a driving propensity index based on at least one first signal selected from the plurality of input signals;
      a second neural network module for calculating a slope index and an effective slope index on the basis of at least one of second signals selected from the plurality of input signals;
      a third neural network module for calculating a satisfaction index on the basis of at least one of third signals selected from the plurality of input signals; and
      a first calculating module for calculating the shift-pattern adjusting coefficient on the basis of signals received from the first, second, and third neural network modules.

22. The apparatus of claim 21, wherein threshold vehicle speeds corresponding to throttle openings are adjusted in the adjusted shift-pattern, where adjustment of the threshold vehicle speed increases as a throttle opening decreases from a predetermined opening and as the shift-pattern adjusting coefficient increases.

23. The apparatus of claim 21, wherein the shift control unit comprises one or more processors and the modular neural network is implemented in said one or more processors as software.

24. The apparatus of claim 21, wherein the detecting unit comprises:
a vehicle speed detector for detecting a running speed of the vehicle;
an engine speed detector for detecting a revolution speed of an engine;
a turbine speed detector for detecting a speed of a turbine, said turbine being included in the automatic transmission;
a throttle opening detector for detecting a throttle opening;
a brake operation detector for detecting an operation of a brake; and
an engine torque detector for detecting a current torque of the engine.

25. The apparatus of claim 24, wherein the engine torque detector comprises a processor for controlling the engine.

26. The apparatus of claim 21, wherein threshold vehicle speeds corresponding to throttle openings are adjusted in the adjusted shift-pattern, where adjustment of the threshold vehicle speed is proportional to the shift-pattern adjusting coefficient and to how much smaller a throttle opening is than a predetermined opening.

27. The apparatus of claim 21, wherein the first neural network module comprises:
a second calculating module for calculating a vehicle load on the basis of at least one signal selected from the at least one first signal;
a fourth neural network module for calculating a driver's operating state index on the basis of at least one signal selected from the first signals;
a fifth neural network module for calculating a kick-down propensity index on the basis of at least one signal selected from the first signals;
a sixth neural network module for calculating a driver's will index on the basis of the driver's operating state index and the kick-down propensity index; and
a seventh neural network module for calculating the driving propensity index on the basis of the vehicle load and the driver's will index.

28. The apparatus of claim 27, wherein the second calculating module calculates the vehicle load as a value obtained from an equation $$Lve = TEacc\,TEmax - (TE - TEacc)$$

where TE is a torque currently generated by an engine, TEmax is a maximum torque of the engine, and TEacc is acceleration torque denoting an amount of engine torque used to accelerate to the torque currently generated TE.

29. The apparatus of claim 27, wherein the fourth neural network module calculates the driver's operating state index on the basis of input signals including throttle opening, throttle opening change rate, brake operation, vehicle speed, and vehicle acceleration signals.

30. The apparatus of claim 27, wherein the driver's operating state index is calculated selectively from a plurality of predetermined values.

31. The apparatus of claim 27, wherein the fifth neural network module calculates the kick-down propensity index on the basis of input signals including throttle opening change rate, vehicle speed, and target shift-speed signals.

32. The apparatus of claim 31, wherein the kick-down propensity index is calculated selectively from a plurality of predetermined values.

33. The apparatus of claim 21, wherein the second neural network module comprises:
an eighth neural network module for calculating a road state index on the basis of at least one signal selected from the second signals;
a ninth neural network module for calculating an acceleration-deceleration index on the basis of at least one signal selected from the second signals;
a tenth neural network module for calculating a throttle operation index on the basis of at least one signal selected from the second signals;
an eleventh neural network module for calculating an engine brake requirement index on the basis of the acceleration-deceleration index and the throttle operation index; and
a twelfth neural network module for calculating a slope index and an effective slope index on the basis of input signals including the road state index and the engine brake requirement index.

34. The apparatus of claim 33, wherein the eighth neural network module calculates the road state index on the basis of input signals including vehicle acceleration, vehicle speed, slope resistance, throttle opening, and brake operation signals.

35. The apparatus of claim 33, wherein the ninth neural network module calculates the acceleration-deceleration index on the basis of input signals including throttle opening and vehicle speed signals.

36. The apparatus of claim 33, wherein the tenth neural network module calculates the throttle operation index on the basis of input signals including throttle opening, vehicle speed, and duration of the throttle opening signals.

37. The apparatus of claim 33, wherein the engine brake requirement index is calculated selectively from a plurality of predetermined values.

38. The apparatus of claim 33, wherein the twelfth neural network module calculates the slope index and the effective slope index on the basis of input signals further including current shift-speed, target shift-speed, and brake operation signals.

39. The apparatus of claim 33, wherein each of the slope index and effective slope index is calculated selectively from a plurality of predetermined values.

40. The apparatus of claim 21, wherein the third neural network module calculates the satisfaction index on the basis of input signals including slope index, effective slope index, throttle opening, brake operation, slope resistance, and target shift-speed signals.

41. The apparatus of claim 21, wherein the first calculating module calculates the shift-pattern adjusting coefficient by a monotonic function with respect to the satisfaction index.

42. The apparatus of claim 21, wherein the first calculating module calculates the shift-pattern adjusting coefficient proportionally to each of the satisfaction index, the driving propensity index, the slope index, and the effective slope index.

43. The apparatus of claim 21, wherein the first calculating module calculates the shift-pattern adjusting coefficient as a value satisfying an equation "Mp=(Dacc+dd).times.Dm+(1−Dm).times.Df", where Df is the driving propensity index, Dm is the slope index, Dacc is the effective slope index, and dd is a difference between the satisfaction index and a predetermined value.

* * * * *